US010850659B2

(12) United States Patent
Stocks et al.

(10) Patent No.: US 10,850,659 B2
(45) Date of Patent: Dec. 1, 2020

(54) INTERCHANGEABLE TRUCK BED

(71) Applicant: NR-LOK, Corp., Rock Springs, WY (US)

(72) Inventors: Greg Stocks, Rock Springs, WY (US); Thomas Mudge, Bountiful, UT (US)

(73) Assignee: NR-LOK, CORP., Rock Springs, WY (US)

( * ) Notice: Subject to any disclaimer, the term of this patent is extended or adjusted under 35 U.S.C. 154(b) by 109 days.

(21) Appl. No.: 16/043,135

(22) Filed: Jul. 23, 2018

(65) Prior Publication Data
US 2018/0326891 A1 Nov. 15, 2018

Related U.S. Application Data

(63) Continuation of application No. 15/221,560, filed on Jul. 27, 2016, now Pat. No. 10,029,603.

(60) Provisional application No. 62/197,527, filed on Jul. 27, 2015.

(51) Int. Cl.
*B60P 3/42* (2006.01)
*B62D 24/00* (2006.01)
*B62D 27/06* (2006.01)
*B62D 63/02* (2006.01)

(52) U.S. Cl.
CPC ............... *B60P 3/42* (2013.01); *B62D 24/00* (2013.01); *B62D 27/06* (2013.01); *B62D 63/025* (2013.01)

(58) Field of Classification Search
CPC ................ B60P 3/423; B62D 33/077

USPC .......... 296/193.04, 35.1, 35.3, 37.6
See application file for complete search history.

(56) References Cited

U.S. PATENT DOCUMENTS

| | | | |
|---|---|---|---|
| 3,068,038 A | 12/1962 | Douglass | |
| 3,586,363 A | 6/1971 | Omlid | |
| 3,854,621 A | 12/1974 | Parry | |
| 4,046,399 A | 9/1977 | Zeuner | |
| 4,456,414 A | 6/1984 | Williams | |
| 4,489,977 A * | 12/1984 | Earing, Jr. | B60P 3/42 296/183.1 |
| 4,522,550 A | 6/1985 | Whitehouse | |
| 4,556,247 A | 12/1985 | Mahaffey | |
| 4,704,062 A | 11/1987 | Hale | |
| 4,737,055 A * | 4/1988 | Scully | B60P 7/13 114/75 |
| 4,750,855 A * | 6/1988 | Anderson | B60P 3/42 296/35.3 |
| 4,842,326 A * | 6/1989 | Divito | B60P 3/42 296/10 |
| 4,969,690 A | 11/1990 | Smith | |
| 5,263,807 A | 11/1993 | Pijanowski | |
| 5,301,997 A * | 4/1994 | Cudden | B60P 3/42 29/401.1 |

(Continued)

*Primary Examiner* — Jason S Morrow
*Assistant Examiner* — E Turner Hicks
(74) *Attorney, Agent, or Firm* — Kunzler Bean & Adamson, PC

(57) ABSTRACT

Apparatuses, systems, and methods are disclosed for an interchangeable truck bed is disclosed. A truck chassis including an electric motor. An interchangeable truck bed unit is configured to detachably couple with a truck chassis. A power source for an electric motor is disposed in an interchangeable truck bed unit to provide power to the electric motor through an electrical coupling between the interchangeable truck bed unit and a truck chassis.

19 Claims, 8 Drawing Sheets

(56) References Cited

U.S. PATENT DOCUMENTS

| | | | | |
|---|---|---|---|---|
| 5,573,300 | A * | 11/1996 | Simmons | B60P 3/42 |
| | | | | 296/193.04 |
| 5,829,946 | A | 11/1998 | McNeilius | |
| 5,893,777 | A | 4/1999 | Kantor | |
| 6,557,944 | B1 | 5/2003 | Connor | |
| 6,596,941 | B2 | 7/2003 | Tripoli | |
| 6,786,735 | B2 * | 9/2004 | Gothier | H01R 13/2421 |
| | | | | 280/422 |
| 7,206,720 | B2 | 4/2007 | LaPant | |
| 7,357,457 | B2 * | 4/2008 | Thomas | B60P 1/16 |
| | | | | 298/1 A |
| 8,262,119 | B2 | 9/2012 | Glazner | |
| 8,434,990 | B2 | 5/2013 | Claussen | |
| 8,714,632 | B2 | 5/2014 | Chapman | |
| 8,840,128 | B2 | 9/2014 | Glazner | |
| 8,998,556 | B2 | 4/2015 | Learned | |
| 9,162,654 | B2 | 10/2015 | Moller | |
| 9,227,675 | B1 * | 1/2016 | Elquest | B62D 33/033 |
| 9,327,632 | B1 | 5/2016 | Bartel | |
| 10,029,603 | B2 | 7/2018 | Stocks et al. | |
| 2007/0252435 | A1 | 11/2007 | Coe | |
| 2009/0079161 | A1 * | 3/2009 | Muchow | F03D 9/10 |
| | | | | 280/400 |
| 2009/0079229 | A1 * | 3/2009 | Schmidt | B60P 3/341 |
| | | | | 296/164 |
| 2011/0226539 | A1 * | 9/2011 | Huss | B60K 6/46 |
| | | | | 180/65.21 |
| 2011/0291444 | A1 * | 12/2011 | Ische | B60P 3/42 |
| | | | | 296/193.04 |
| 2012/0303397 | A1 * | 11/2012 | Prosser | B60L 53/57 |
| | | | | 705/7.12 |
| 2015/0015065 | A1 * | 1/2015 | Brunais | B60L 3/00 |
| | | | | 307/10.8 |
| 2016/0114640 | A1 | 4/2016 | Huegerich | |

* cited by examiner

INTERCHANGEABLE TRUCK BED

CROSS-REFERENCES TO RELATED APPLICATIONS

This application is a continuation of U.S. patent application Ser. No. 15/221,560 entitled "Interchangeable Truck Bed" and filed Jul. 27, 2016 for Greg Stocks and Thomas Mudge, which claims the benefit of U.S. Provisional Patent Application No. 62/197,527 entitled "Interchangeable Truck Bed" and filed on Jul. 27, 2015 for Greg Stocks and Thomas Mudge, both of which are incorporated herein by reference.

FIELD

This invention relates to truck beds and more particularly relates to interchangeable truck beds using a locking mechanism.

BACKGROUND

When a truck is received from a manufacturer, the truck usually has one truck bed attached to the chassis. The truck bed is usually not removable. Additionally, the truck bed is usually limited to one or only a few functions.

However, many truck owners and operators have multiple uses for their trucks. These uses may include construction, hauling equipment, hauling materials, farming, transportation, or the like. Unfortunately, since most trucks have only one bed, truck owners and operators often purchase multiple trucks for the different uses. This may require a truck owner and operator to refuel, maintain, and register each individual truck, which can be very costly.

SUMMARY

A system for an interchangeable truck bed is disclosed. In one embodiment, the system may include a truck chassis configured to detachably couple with a truck bed unit. In one embodiment, the system may include an interchangeable truck bed unit configured to detachably couple with the truck chassis. In one embodiment, the system may include one or more extensions disposed on an upper side of the truck chassis. The extension may protrude away from the truck chassis. In one embodiment, the system may include one or more receiving mechanisms disposed on an underside of the interchangeable truck bed. In one embodiment, the one or more receiving mechanisms may detachably couple to at least a portion of the one or more extensions.

An apparatus for an interchangeable truck beds disclosed. In one embodiment, the apparatus may include a substantially flat truck bed configured to detachably couple to a truck chassis. In one embodiment, the apparatus may include one or more receiving mechanisms disposed on an underside of the truck bed. In one embodiment, the one or more receiving mechanisms may detachably coupleable to at least a portion of the truck chassis. In one embodiment, the apparatus may include one or more mount coupled to the truck bed. In one embodiment, the mount may include a leg that extends away from the truck bed and supports the apparatus. The leg may extend away from the truck bed and support the apparatus in response to the apparatus decoupling from the truck chassis.

A method for an interchangeable truck bed is disclosed. In one embodiment, the method may include providing a truck chassis configured to detachably couple with a truck bed unit. In one embodiment, the method may include providing an interchangeable truck bed unit configured to detachably couple with the truck chassis. In one embodiment, the method may include decoupling the truck bed unit from the truck chassis. In one embodiment, the method may include elevating the truck bed unit away from the truck chassis. In one embodiment, the method may include lowering a second interchangeable truck bed unit onto the truck chassis. In one embodiment, the method may include coupling the second truck bed unit to the truck chassis.

BRIEF DESCRIPTION OF THE DRAWINGS

In order that the advantages of the invention will be readily understood, a more particular description

DETAILED DESCRIPTION

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, structures, or characteristics of the invention may be combined in any suitable manner in one or more embodiments. In the following description, numerous specific details are provided, such as examples of mechanical structures, electrical devices, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 1A:
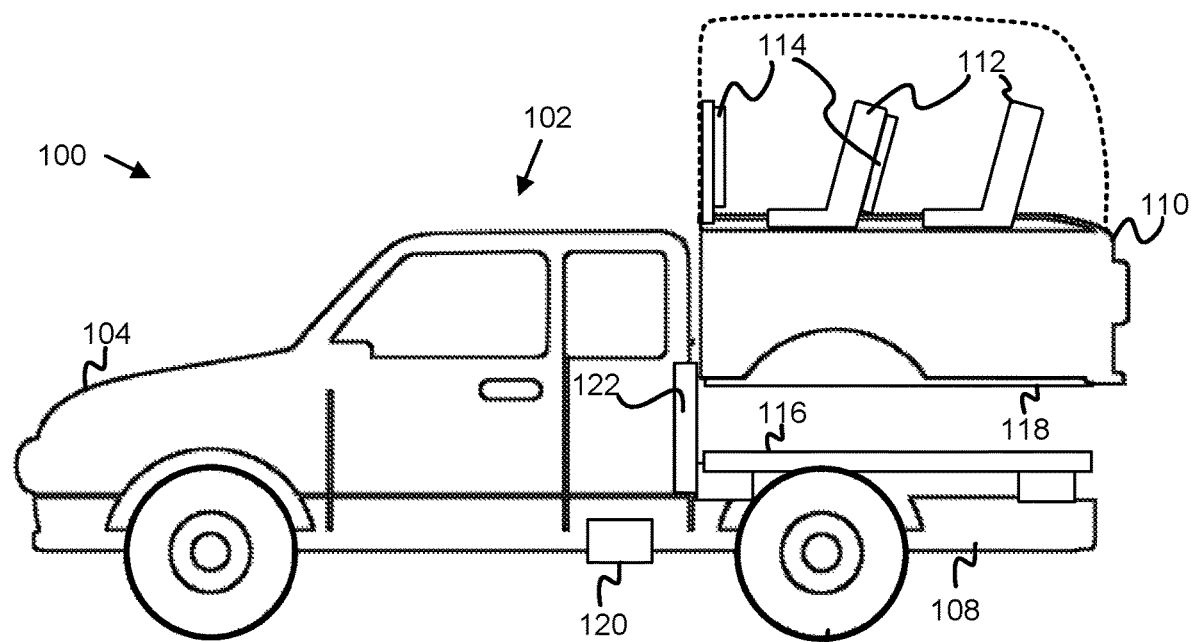
FIG. 1A is a side view illustrating one embodiment of a system for an interchangeable truck bed.

FIG. 1A depicts one embodiment of a system 100 for interchanging a truck bed unit of a truck. The system 100, in certain embodiments, includes a truck 102. Although the truck 102 depicted in FIG. 1A is a pickup truck, it should not be understood that the truck 102 is limited to a pickup truck. The truck 102 may include a pickup truck, a medium truck, a heavy truck, a tractor, or the like.

In one embodiment, the system 100 may include a space 104 for a power source, such as an engine (including a gasoline engine), a diesel engine, or the like. The truck may include the space 104. The space 104 may be disposed in front of the cab of the truck 102, as depicted in FIG. 1A, may be disposed under the cab of the truck 102, or the like. The power source may include a motor, such as an electric motor, or the like. The space 104 may include a space for a power storage, such as a battery, fuel tank, or the like. In some embodiments, the power storage may be disposed elsewhere on or in the truck 102. For example, in one embodiment, the fuel tank may be disposed near the rear of the truck 102 closer to a fuel nozzle receiver.

In some embodiments, the system 100 may include one or more wheels 106, one or more transmission components, one or more suspension components, or the like. The truck 102 may include the wheels 106. In one embodiment, the truck 102 may include four wheels 106. In one embodiment, the truck 102 may include more than or fewer than four wheels.

In one embodiment, the system 100 may include a truck chassis 108. The truck chassis may be configured to detachably couple with a truck bed unit. The truck 102 may include the truck chassis 108. In certain embodiments, the truck chassis 108 may include a framework configured to support at least a portion of the truck 102 or a portion of a truck bed unit 110.

In one embodiment, the system 100 may include an interchangeable truck bed unit 110. The truck bed unit 110 may be configured to detachably couple with the truck chassis 108. In some embodiments, the truck bed unit 110 may be an apparatus. The apparatus may include one or more components, system, or the like as described below. The truck bed unit 110 may include a substantially flat bed.

In one embodiment, the truck bed unit 110 may include a structure that may couple and decouple to the truck chassis 108 of the truck 102. The truck bed unit 110 may include a structure configured for a specific purpose such as carrying cargo, carrying one or more people, carrying equipment, or the like.

In one embodiment, the truck bed unit 110 may include a passenger bed. The passenger bed may include one or more seats configured to hold one or more passengers in the one or more seats. The truck bed unit 110 may include a box bed. The box bed may include at least one wall extending upwards from a bed of the truck bed unit 110. The box bed may be configured to hold cargo. The truck bed unit 110 may include a flatbed. The flatbed may include a flat surface. The truck bed unit 110 may include a fuel economy bed. The economy fuel bed may include a cover disposed over a box bed. The cover may be configured to reduce air resistance of the truck bed unit 110. The truck bed unit 110 may include an off-road vehicle hauler. The off-read vehicle hauler may include a ramp extendable away from the truck bed unit 110. The ramp may be configured to provide a ramped surface from the ground to a bed of the truck bed unit 110. The truck bed unit 110 may include a camper. The camper may include an enclosure configured to provide a living space for one or more people. The truck bed unit 110 may include a towing bed. The towing bed may be configured to tow a second vehicle. The towing bed may include a crane. The truck bed unit 110 may include a tanker bed. The tanker bed may include a tank configured to hold a fluid.

The truck bed unit 110 may include a limousine bed, a dump truck bed, a heavy equipment bed, a bed for hauling minerals or mining equipment, a military gun turret bed, a military personnel transport bed, a military HUMVEE bed, a specialized bed (e.g., a glass carrier bed, a utility bed, a landscaping equipment bed), or another type of truck bed that the one or more receiving mechanisms 118 can connect to the truck chassis 108 of the truck 102.

In one embodiment, the truck bed 110 may include a structure shaped to fit with the shape of truck 102. For example, a truck bed 110 with a structure shaped to fit with the shape of the truck 102 may look as though the truck bed unit 110 and the truck 102 were a uniform structure, as though the truck bed unit 110 were manufactured with the truck 102, or the like. In one embodiment, several surfaces of the truck 102 and the truck bed unit 110 may align and provide a smooth or uniform surface. The smooth or uniform surface may reduce wind resistance, be aesthetically pleasing, or the like. In one embodiment, the truck bed unit 110 may include a recess that fits around a wheel 106 of the truck 102.

In one embodiment, the system 100 may include a truck bed unit 110 that includes one or more seats 112, one or more airbags 114, one or more lights, one or more vents for heating and/or air conditioning, one or more speakers for audio, one or more monitors for video, or the like. The one or more seats 112 may include seat belts, safety straps, other safety features, or the like. The one or more seats 112 may be arranged in rows, columns, or the like. The one or more seats may face the rear of the truck 102, the front of the truck 102, or one or more sides of the truck 102. The one or more airbags 114 may be disposed in front of the one or more seats 112, to one or more sides of the one or more seats 112, or the like. The one or more lights may include lights that illuminate the area around the one or more seats 112, one or more taillights (such as brake lights or turn signals), or the like.

In one embodiment, the system 100 may include one or more extensions 116. The one or more extensions 116 may be disposed on an upper side of the truck chassis 108. The one or more extensions 116 may protrude away from the truck chassis 108. In some embodiments, the one or more extensions 116 may connect the truck bed unit 110 to the truck chassis 108. The one or more extensions 116, in certain embodiments, may include a hydraulic/pneumatic locking mechanism, an electric locking mechanism, an electric hydraulic/pneumatic locking mechanism, or the like. In one embodiment, the one or more extensions 116 may include a combination of the previously mentioned types of locking mechanisms. Various forms of the one or more extensions 116 are described in greater detail below.

In one embodiment, the system 100 may include one or more receiving mechanisms 118. The one or more receiving mechanisms 118 may be disposed on an underside of the truck bed 110. In some embodiments, the one or more receiving mechanisms 118 may detachably couple to at least a portion of the one or more extensions 116.

In certain embodiments, the system 100 may connect or disconnect a truck bed unit 110 from the truck 102 using the one or more extensions 116 and the one or more receiving mechanisms 118. The truck bed unit 110 may include one or more receiving mechanisms 118. The receiving mechanism 118 may receive the locking mechanism 116 and may facilitate the locking mechanism 116 connecting the truck 102 to the truck bed unit 110. The receiving mechanism 118 may include a hole, groove, indent, a hook, a clamp, or another type of interface that may facilitate the locking mechanism 116 connecting the truck 102 to the truck bed unit 110. Various types of extensions 116 and receiving mechanisms are described below.

In some embodiments, by using locking mechanisms to connect or disconnect a truck bed unit 110 from the truck 102, an operator of the truck 102 may interchange the truck bed unit 110 with another truck bed unit 110, allowing the operator to use the truck 102 for multiple purposes without purchasing multiple trucks. Furthermore, in some embodiments, the owner or operator of the truck 102 may interchange truck bed units 110 to avoid maintaining, refueling, and registering multiple trucks.

In one embodiment, the system 100 may include an alignment unit 120 that may facilitate the alignment of the one or more extensions 116 with the one or more receiving mechanisms 118. The alignment unit 120 may include a controller or other computing device, one or more cameras or other sensors, and/or another hardware device that facilitates the alignment of the one or more extensions 116 with the one or more receiving mechanisms 118. In one embodiment, the one or more extensions 116, the receiving mechanisms 118, the truck chassis 108, or other portions of the truck 102 may include a portion of the sensors and/or other apparatuses of the alignment unit 120. In one embodiment, the one or more extensions 116 may connect the truck bed unit 110 with the truck chassis 108 in response to the alignment unit 120 aligning the one or more extensions 116 and the one or more receiving mechanisms 118. The alignment unit 120 may include an output device that may indicate to a user whether the truck 102 is in a position that is aligned with the truck bed unit 110. The output device of the alignment unit may indicate to a user how to move the truck 102 to align with the truck bed unit 110. The alignment unit 120 may indicate to the user using sounds, visual cues (e.g. via a screen in the cab), a combination of sounds and visual cues, or the like. In one embodiment, the alignment unit 120 may communicate with one or more systems of the truck bed unit 110. The truck bed unit 110 may send alignment data to the alignment unit 120. In one embodiment, the alignment unit 120 may control the truck 102 and automatically move the truck 102 into an alignment position with the truck bed unit 110.

The system 100 may include a seal 122. The truck 102 may include the seal 122. In certain embodiments, the seal 122 may include a pan, a plate, a ring, or the like. The seal 122 may include a seal formed or shaped in the shape of the front of the truck bed unit 110, the back of the cab of the truck 102, or the like. The seal 122 may be disposed at the front of the truck bed unit 110 and protect the front of the truck bed unit 110 from scratching, scraping, and the like the truck 102. The seal 122 may prevent water, dust particles, and the like from entering the space between the truck 102 and the truck bed unit 110.

In one embodiment, the truck bed unit 110 may include the one or more extensions 116 and the truck chassis 108 may include the one or more receiving mechanisms 118. The one or more extensions 116 connecting the truck bed unit 110 to the truck chassis 108 may include retracting the extensions 116 and pulling the truck bed unit 110 toward the truck chassis 108.

Figure 1B:
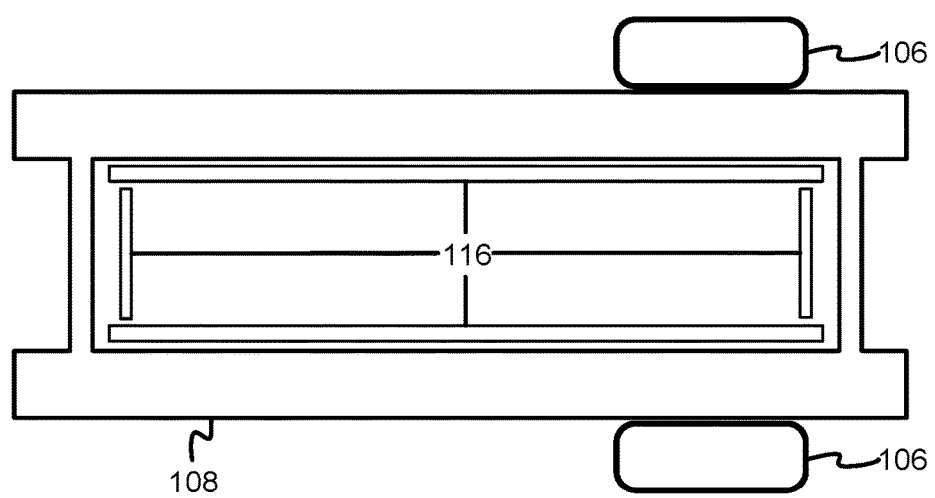
FIG. 1B is a cutaway top view illustrating one embodiment of a system for an interchangeable truck bed.

FIG. 1B depicts one embodiment of a system 100 for an interchangeable truck bed. The system may include the truck chassis 108. The truck chassis 108 may include the one or more extensions 116. The one or more extensions 116 may be arranged on the chassis with two or more of the extensions 116 lateral to the chassis and two or more of the extensions 116 longitudinal to the chassis.

While the embodiments are described herein primarily with regard to full-size road and utility vehicles, in certain embodiments, a truck 102 and a truck bed unit 110 may comprise a miniature toy, such as an injection molded plastic or die-cast metal toy; a remote control toy (e.g., with various interchangeable truck bed units 110 such as a squirt gun unit 110 with a trigger, button, or other interface on the remote control to squirt the water; a walkie-talkie unit with a speaker that projects audio from a microphone of the remote control unit 110; a bulldozer unit 110 that actuates in response to a command from the remote control; a dump truck unit 110 that actuates in response to a command from the remote control; a seating unit 110 for children, for action figures, for stuffed animals, or the like; and/or another remote control unit 110); a model; a ride-on toy for children (e.g., scoot powered, with pedals to mechanically power one or more wheels, with an electrical motor, with a fuel engine, or the like); and/or another type of truck 102 with one or more interchangeable truck bed units 110 that are smaller than full-size. The receiving mechanisms 118 and/or extensions 116, in certain embodiments, may be different for a toy or other smaller truck 102. For example, the extensions 116 and or receiving mechanisms 118 may comprise one or more magnets, a hook and loop fastener, a tension fit, complimentary interlocking extensions 116 and receiving mechanisms 118, or the like, which may not be configured for use with a full-size, road, utility truck 102.

In a further embodiment, a truck 102 and interchangeable truck bed unit 110 paradigm may be visually and/or virtually depicted in a paper or electronic book, in a video game, or the like. For example, in a video game, a player may drive a virtual truck 102 and may use different interchangeable truck bed units 110 to accomplish different tasks within the video game; in a book or video game, a player may place one or more different interchangeable beds in order, in place within an equation, in a blank within a word, or the like to solve educational questions or problems; or the like. Use of an interchangeable truck bed paradigm in toys, video games, books, or the like, in certain embodiments, may serve as advertising for or to improve brand recognition for full-size, utility trucks 102, in addition to providing educational and/or entertainment value.

Figure 2A:
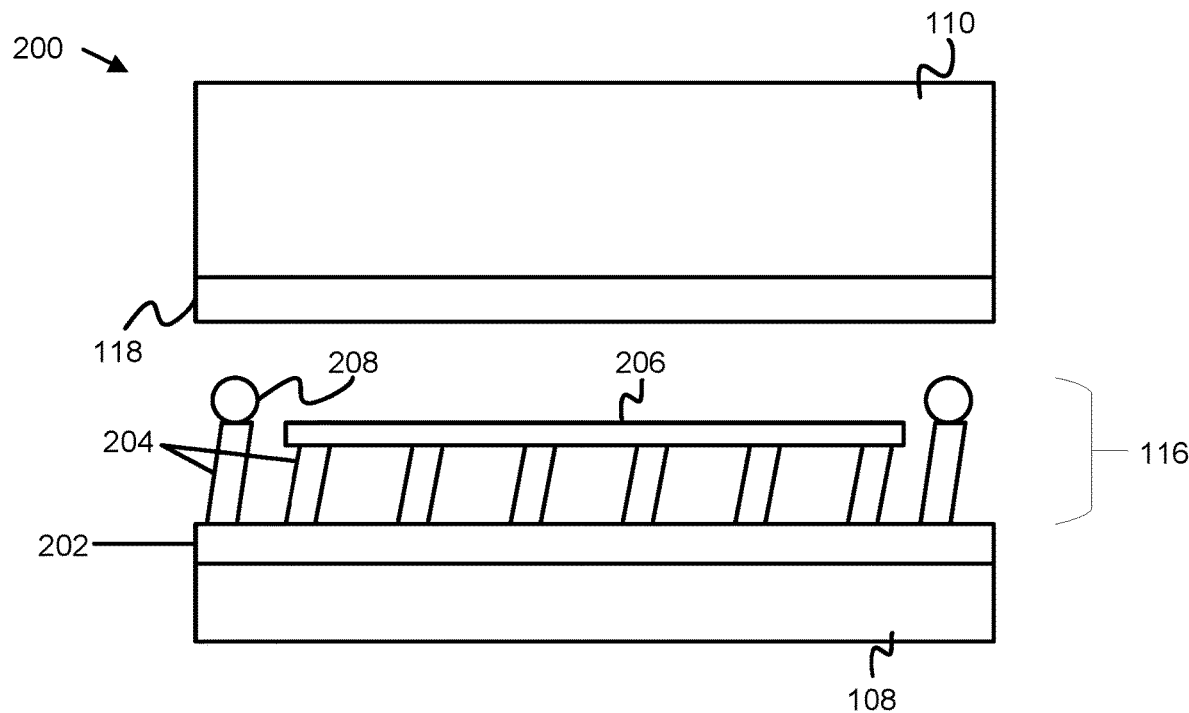
FIG. 2A is a cutaway side view illustrating another embodiment of a system for an interchangeable truck bed.

FIG. 2A depicts one embodiment of a system 200 for an interchangeable truck bed. The system 200 may include the one or more extensions 116. The system 200 may include the one or more receiving mechanisms 118.

In one embodiment, the system 200 may include a hydraulic/pneumatic device 202. In one embodiment, the one or more extensions 116 may include the one or more hydraulics/pneumatics devices 202. The hydraulic/pneumatic device 202 may raise or lower one or more portions of the one or more extensions 116. The hydraulic/pneumatic device 202 may connect the one or more locking mechanism 116 to the truck chassis 108.

In some embodiments, the system 200 may include one or more lock extenders 204. In some embodiments, the one or more extensions 116 may include the one or more lock extenders 204. The lock extenders 204 may extend one or more portions of the one or more extensions 116 toward the truck bed unit 110. In one embodiment, the one or more lock extenders 204 may include a high-tension spring. The one or more lock extenders 204 may include high-tension springs of different lengths. For example, as shown in FIG. 2A, the lock extenders 204 that couple to the locks 206 may be longer than the lock extenders 204 that couple to the rest bar 206. By using lock extenders 204 of different lengths, the locking mechanism 116 may communicate with the alignment unit 120 and align the truck 102 with the truck bed unit 110 or aid the operator in aligning the truck 102 and the truck bed unit 110.

In one embodiment, a locking mechanism 116 may include the lock extenders 204 at an angle where the top of the locking mechanism leans rearward (i.e. away from the cab of the truck 102). The locking mechanism 116 engaging with the receiving mechanism 118 and connecting the truck bed unit 110 to the truck chassis 108 may include moving the bed forward (i.e. toward the cab of the truck 102). Moving the truck bed unit 110 forward may include connecting the truck bed unit 110 to the seal 122.

In one embodiment, the system 200 may include a rest bar 206. In one embodiment, the one or more extensions 116 may include the rest bar 206. The rest bar 206 may include a bar that the truck bed unit 110 may rest on. The rest bar 206 may include a bar that may fit inside the receiving mechanism 118. The one or more lock extenders 204 may couple to the rest bar 206. The rest bar 206 may connect with the one or more receiving mechanisms 118. The rest bar 206 may allow the truck bed unit 110 to rest on the truck chassis 108.

The one or more extensions 116 may include one or more locks 206. The one or more lock extenders 204 may couple to one or more locks 206. The lock 206 may engage with the receiving mechanism 118. The lock 206 engaging with the receiving mechanism 118 may include the lock 206 sliding into the receiving mechanism 118, the lock 206 expanding into the receiving mechanism 118, the lock 206 swiveling into the receiving mechanism 118, the lock 206 extending into the receiving mechanism 118, the lock 206 grabbing the receiving mechanism 118, or the like. The lock 206 engaging with the receiving mechanism 118 may connect the truck 102 with the truck bed unit 110. The lock 206 engaging with the receiving mechanism 118 may include connecting the truck 102 with the truck bed unit 110 by the one or more extensions 116 pulling the truck bed unit 110 down toward the truck chassis 108, by the one or more extensions 116 pulling the truck chassis 108 up toward the truck bed unit 110, or the like.

In one embodiment, the one or more extensions 116 may disconnect the truck bed unit 110 from the truck chassis 108. Disconnecting the truck bed unit 110 from the truck chassis 108 may include disengaging the lock 206 from the receiving mechanism 118. Disconnecting the truck bed unit 110 from the truck chassis 108 may include the hydraulic/pneumatic device 202 retracting the lock extenders 204.

In one embodiment, the one or more extensions 116 may connect to the truck bed unit 110 in response to the transmission of the truck 102 being in "Park" or in "Neutral," or in response to engaging the emergency/hand brake of truck 102. In one embodiment, the one or more extensions 116 may disconnect the truck bed unit 110 in response to the transmission of the truck 102 being in "Park" or in "Neutral," or in response to engaging the emergency/hand brake of the truck 102.

In one embodiment, the one or more extensions 116 may prevent the transmission of the truck 102 from changing gears (e.g. from "Park" to "Drive," "Neutral" to "First Gear," or the like) in response to the one or more extenders 204 being extended. The one or more extensions 116 may prevent the extenders 204 from extending in response to the transmission of the truck 102 being in a movable gear (e.g. "Drive," "Reverse," "First Gear," and the like).

In one embodiment, the system 200 may include a manual override that may allow a user to use the one or more extensions 116 to connect the truck bed unit 110 to the truck chassis 108. The manual override may allow a user to use the one or more extensions 116 to disconnect the truck bed unit 110 from the truck chassis 108 without a power source.

Figure 2B:
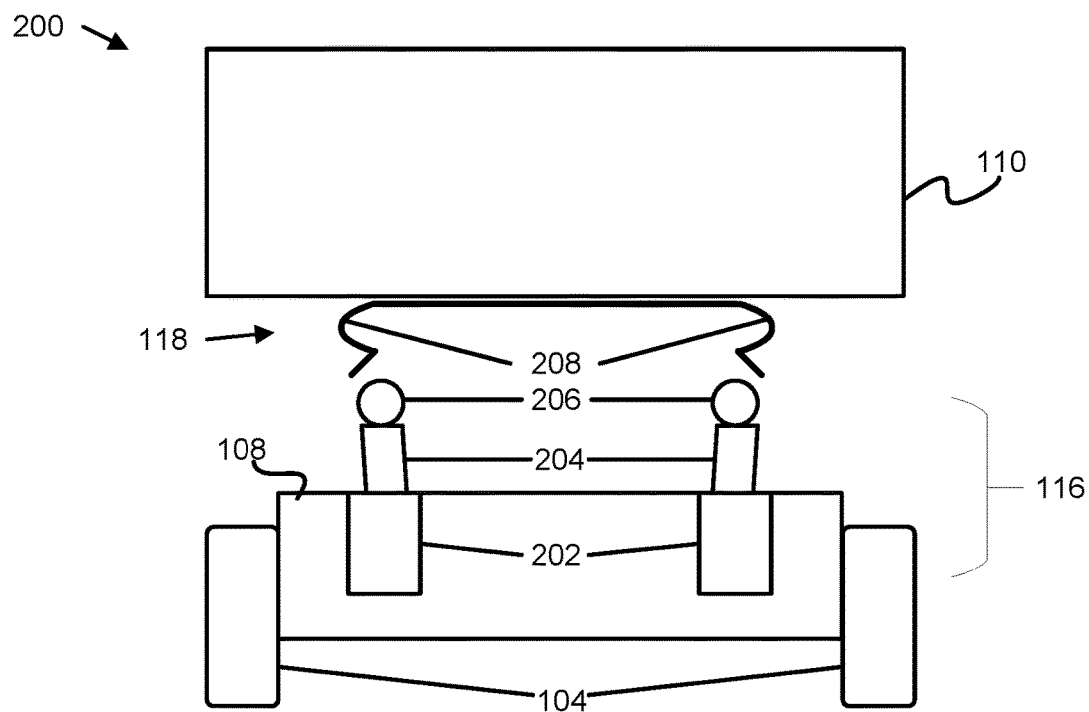
FIG. 2B is a cutaway rear view illustrating one embodiment of a system for an interchangeable truck bed.

FIG. 2B depicts one embodiment of a system 200 for an interchangeable truck bed. In one embodiment, the system 200 may include one or more receiving mechanisms 118. The one or more receiving mechanisms 118 may be disposed on the bottom of the truck bed unit 110. In one embodiment, the receiving mechanisms 118 may be mounted to the truck bed unit 110. In one embodiment, the receiving mechanism 118 may be built into the truck bed unit 110. In one embodiment, the receiving mechanism 118 may include one or more components used to lock the truck bed unit 110 to the truck chassis 108 of the truck 102. In one embodiment, the one or more components may be disposed on the receiving mechanism 118 to align with one or more components of the locking mechanism 116.

In one embodiment, the receiving mechanism 118 may include one or more grooves 208 that receive the one or more locks 206. The one or more grooves 208 may include guides for lock 206. The hydraulics/pneumatics device 202 may lower the lock extenders 204 in response to the locks 206 engaging with the locking interface. The one or more locks 206 may include rollers that roll into the grooves 208 of the one or more receiving mechanisms 118.

Figure 2C:
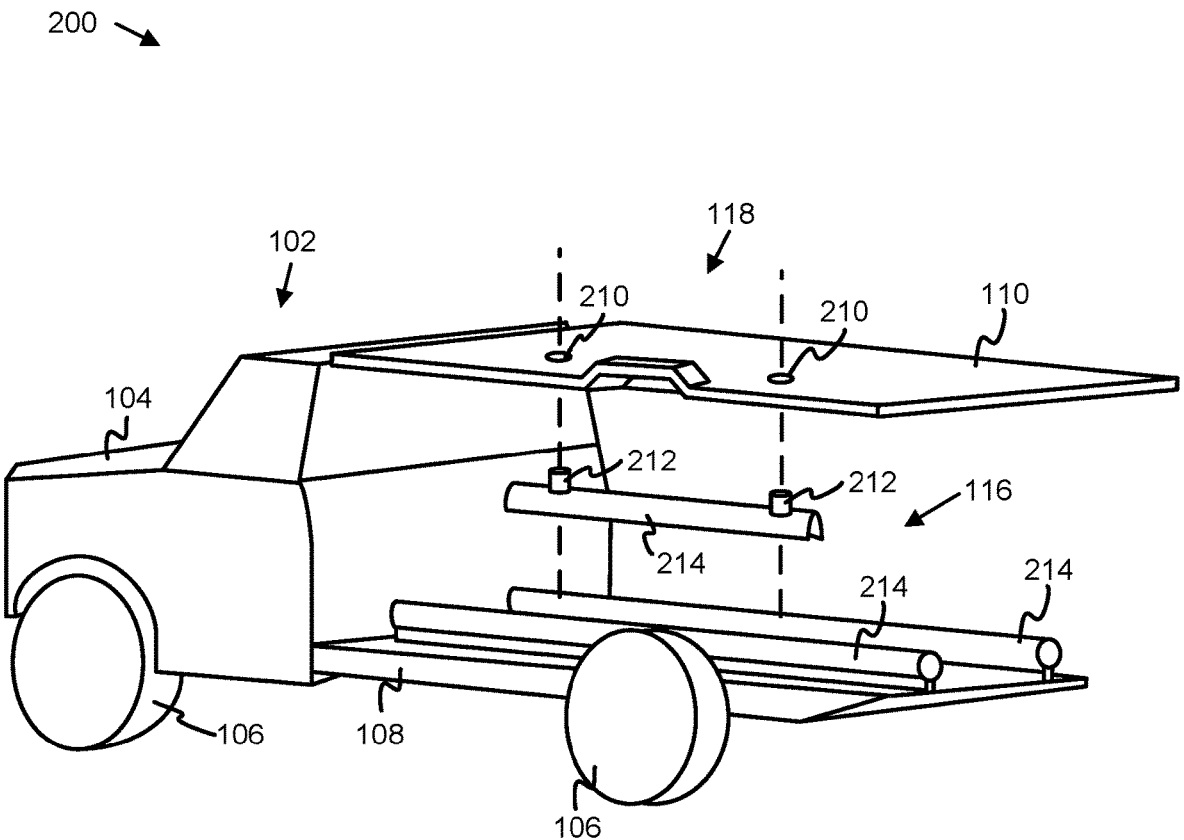
FIG. 2C is a perspective view illustrating one embodiment of a system for an interchangeable truck bed.

FIG. 2C depicts one embodiment of a system for an interchangeable truck bed. In one embodiment, the receiving mechanism 118 may include one or more apertures 210. The apertures 210 may be disposed on the receiving mechanism 118 to align with one or more locking mechanism 116 components. In one embodiment, the one or more apertures 210 may extend at least partially through a surface of the receiving mechanism 118 or the bottom of the truck bed unit 110. The one or more apertures 210 may extend completely through a surface of the receiving mechanism 118 or the bottom of the truck bed unit 110.

In one embodiment, the one or more extensions 116 may include a post 212. The one or more receiving mechanisms 118 may include an aperture 210. The aperture 210 may include one or more apertures. The locking mechanism 116 may include a mounting plate 214 mounted on the one or more rails 216. The mounting plate may be adhered, welded, or the like to the rails 216. The mounting plate 214 may include a plate shaped and sized to overlay at least a portion of a rail 216. The mounting plate 214 may run along at least a portion of the length of the rail 216. The mounting plate 214 may include an adjustable plate that may slide along the rail 216. The adjustable plate 214 may slide along the rail 216 to adjust to the orientation, size, shape, or the like of the receiving mechanism 118 of the truck bed unit 110. In one embodiment, the mounting plate 214 may include the post 212. The post 212 may include one or more posts. In one embodiment, the one or more posts 212 may extend away from the rail without mounting to a mounting plate 214.

The one or more posts 212 may be disposed on an upper portion of the mounting plate 214. The posts 212 may be spaced apart from each other. In one embodiment, the one or more posts 212 may be evenly spaced apart, may include varying width between the raised portions, or a combination. The one or more posts 212 may insert into the one or more apertures 210 of the receiving mechanism 118. In one embodiment, a post 212 may include a portion that locks to the receiving mechanism 118. The post 212 may lock to the receiving mechanism 118 in a similar manner as the lock 206.

Figure 2D:
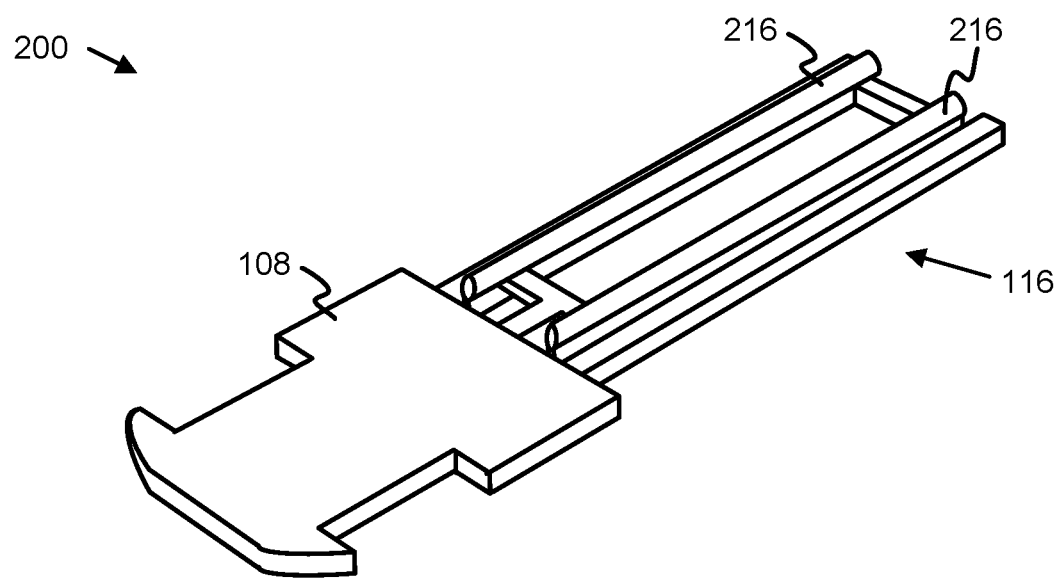
FIG. 2D is a perspective view illustrating one embodiment of a system for an interchangeable truck bed.
Figure 2E:
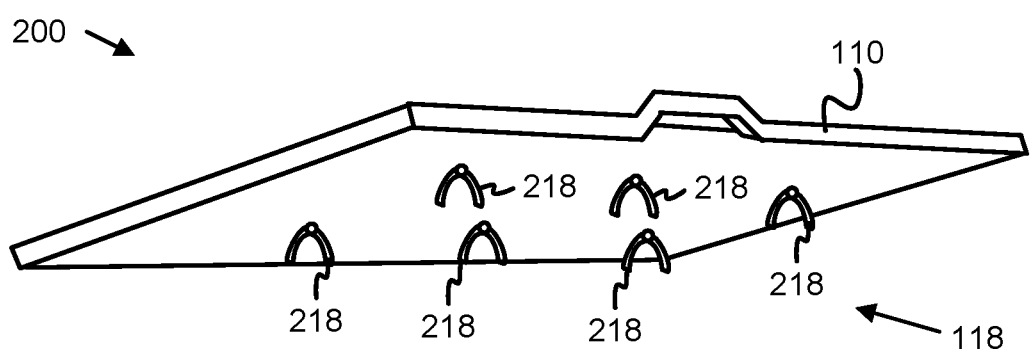
FIG. 2E is a perspective view illustrating one embodiment of a system for an interchangeable truck bed.

FIGS. 2D and 2E depict some embodiments of a system for an interchangeable truck bed. In one embodiment, the one or more extensions 116 may include a rail 216. The one or more receiving mechanisms 118 may include a clamp 218. The rail 216 of the extensions 116 may include one or more rails. The one or more rails 216 may be mounted on the truck chassis 108. The one or more rails 216 may run parallel to each other. The parallel rails 216 may include rails 216 that run lengthwise to the truck 102 (similar to the orientation of the rest bar 206), widthwise to the truck 102, or the like. In one embodiment, the clamp 218 may include one or more clamps. The clamps 218 may be mounted to the bottom of the truck bed unit 110. The clamps 218 may be mounted to the bottom of the truck bed unit 110 to align with one or more rails 216 of the locking mechanism 116. In one embodiment, the one or more clamps 218 may engage with the rails 216 to lock the truck bed unit 110 to the truck 102. The clamps 218 may engage to the rails 216 by gripping the rails 216 and partially surrounding at least a portion of the circumference of the rails 216. In some embodiments, the clamps 218 may automatically grip the rails 216 in response to the clamps 218 being within a certain proximity of the rails 216. In one embodiment, the clamps 218 may grip the rails 216 in response to a control command from a control interface, such as the control panel 406 described below, a remote, or the like.

In one embodiment, the one or more receiving mechanisms 118 may include an aperture 210. The one or more extensions 116 may include a gripping head located distal to the truck chassis 108. The gripping head may be configured to insert at least partially into an aperture 210 of the one or more receiving mechanisms 118 and grip the truck bed unit 110. The one or more extensions 116 may include an extending post that may mechanically extend away from the truck chassis 108. The extending post may include a collapsible post or an extendable post that may adjust in length. The extending post may include a hydraulic/pneumatic or electrical device, which may be substantially as described above with regard to the lock extenders 204.

In one embodiment, the gripping head may include a clamp. The clamp may grip a portion of the aperture of the receiving mechanism 118. The clamp may include a clamp similar to the clamp 218 of FIG. 2E. In one embodiment, the gripping head may include an expanding gripping head. The gripping head sliding into the aperture 210 of the receiving mechanism 118, and expanding into the aperture 210. The gripping head expanding may include one or more flanges extending out of the extension and engage with a side of the aperture 210. The gripping head may swivel into the aperture 210.

In one embodiment, the one or more extensions 116 or the one or more receiving mechanisms 118 may include a hydraulic/pneumatic clamp. The hydraulic/pneumatic clamp may be configured to grip to a protrusion mounted on an extension 116 or a receiving mechanism 118. The one or more extensions 116 or the one or more receiving mechanisms 118 may include an electric clamp. For example, the clamp 218 of FIG. 2E may include a hydraulic/pneumatic clamp. The clamp may be configured to grip to a protrusion mounted on an extension 116 or a receiving mechanism 118. The protrusion may be mounted to the truck chassis 108. In some embodiments, the one or more extensions 116 may include a hydraulic/pneumatic extension configured to extend away from the truck chassis 108. For example, the hydraulic/pneumatic extension may include the hydraulic/pneumatic 202. In some embodiments, the one or more extensions 116 may include an electric extension configured to extend away from the truck chassis 108. A protrusion may include a collapsible rod, a rode that extends out of a portion of the truck chassis 108, or the like.

Figure 3:
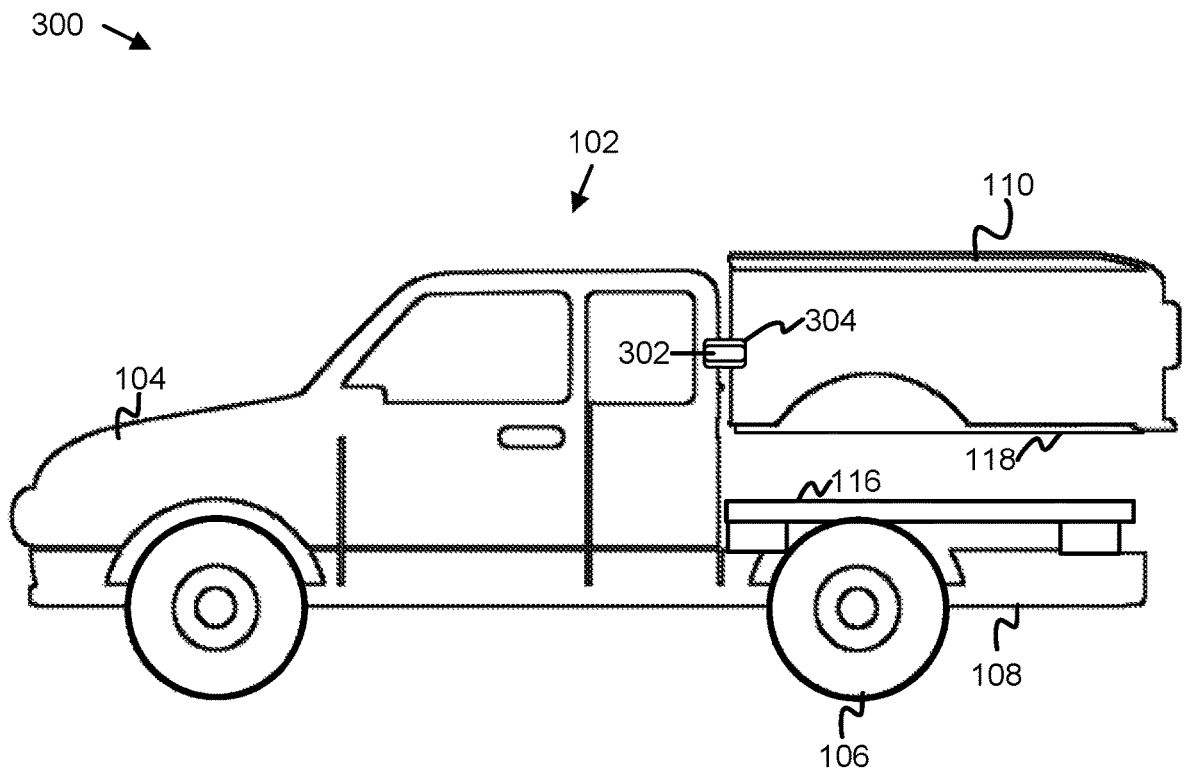
FIG. 3 is a cutaway side view illustrating a further embodiment of a system for an interchangeable truck bed.

FIG. 3 depicts one embodiment of a system 300 for an interchangeable truck bed. In the depicted embodiment, the system 300 may include a truck 102, space 104 for a power source, a truck chassis 108, a truck bed unit 110, and extensions 116, which may be substantially as described above with regard to FIG. 1A. The system 300, in the depicted embodiment, includes one or more couplings 302 that connect one or more systems (e.g., an electrical system, a fuel system, or the like) of the truck 102 to the truck bed unit 110. In some embodiments, the coupling 302 may be configured to connect a truck cab of the truck with the truck bed unit 110.

In one embodiment, the system 300 may include a channel 304 that houses the one or more couplings 302. In one embodiment, the one or more couplings 302 or the channel 304 may temporarily couple to the truck 102 or the truck bed unit 110. The channel 304 may include a retractable channel. The channel 304 may include a flexible channel. The channel 304 may include a plastic channel, a metal channel, or the like. The one or more couplings 302 or channel 304 may include a variety of lengths.

In one embodiment, the one or more couplings 302 may be mounted to a cab of the truck 102. The one or more couplings 302 may be configured to connect the truck 102 with the truck bed unit 110 automatically in response to the one or more extensions 116 connecting the truck bed unit 110 with the truck chassis 108. For example, the one or more couplings 302 may be integrated with, coupled to, or otherwise coupled to the one or more extensions 116. The one or more locking mechanisms 116 may include one or more alignment features for aligning ports of the one or more couplings 302, may lock or couple ports of the one or more couplings 302, or the like.

In one embodiment, the truck bed unit 110 may include one or more systems. The systems may receive power, air, audio/video signals, control signals, data signals, or the like from the truck 102. The one or more couplings 302 may supply power (e.g. electrical, fuel, or the like), air, signals, or the like to the systems of the truck 102. For example, in one embodiment, the coupling 302 may include an electric coupling configured to connect an electrical system of the truck with an electrical system of the truck bed unit 110. In one embodiment, the coupling 302 may include a fuel coupling configured to connect a fuel system of the truck with a fuel system of the truck bed unit 110. In one embodiment, the coupling 302 may include an audio coupling configured to connect an audio system of the truck with an audio system of the truck bed unit 110. In one embodiment, the coupling 302 may include a video coupling configured to connect a video system of the truck with a video system of the truck bed unit 110. In one embodiment, the coupling 302 may include a control signal coupling configured to connect a control system of the truck with a control system of the truck bed unit 110. In one embodiment, the coupling 302 may include a four-wheel drive signal coupling configured to connect a four-wheel drive system of the truck with a four-wheel drive system of the truck bed unit.

In one embodiment, the truck bed unit 110 may include a power source (e.g. an electrical battery, a fuel tank, a system of the truck 102, or the like) that connects with one or more of the systems of the truck 102. The power source may connect with a system of the truck 102 through the one or more couplings 302. The power source of the truck bed unit 110 may supply power to the truck 102 or a system of the truck through the coupling 302. For example, in one embodiment, the truck bed unit 110 may include a battery. The battery of the truck bed unit 110 may connect to the coupling 302 and the coupling 302 may connect to the battery of the truck 102. The battery of the truck bed unit 110 may supply electricity to the battery of the truck 102. The battery of the truck bed unit 110 may act as a backup battery for the truck 102.

In one embodiment, the truck bed unit 110 may include a fuel tank. The fuel tank of the truck bed unit 110 may connect to the coupling 302 and the coupling 302 may connect to the fuel tank of the truck 102. The fuel tank of the truck bed unit 110 may supply fuel to the fuel tank of the truck 102. In some embodiments, the fuel tank of the truck bed unit 110 may act as a backup fuel tank for the truck 102. In one embodiment, the coupling 302 may carry fuel from the fuel tank of the truck bed unit 110 to the engine or other systems of the truck 102 without going through the fuel tank of the truck 102.

In one embodiment, one or more systems of the truck bed unit 110 may supply signals to the truck 102. For example, in one embodiment, the coupling 302 may carry an audio or video signal to the truck bed unit 110. The truck 102 may include a digital video disk (DVD) play and the truck bed unit 110 may include a display monitor. The DVD player may send audio/video signals from the truck 102 to the display monitor of the truck bed unit 110 through an audio/video coupling of the one or more couplings 302. In one embodiment, the battery of the truck 102 may supply electricity to the display monitor of the truck bed unit 110 through an electrical coupling of the one or more couplings 302.

For example, the truck 102 may include one or more control systems. A control system may include one or more mechanical, electrical, electronic, software, hardware, or the like components. A control system may control the operation of one or more systems of the truck bed unit 110. In one embodiment, a system of the truck bed unit 110 may include a status system. The status system may provide information to one or more components of the truck 102 about the status of one or more components of the truck bed unit 110. For example, the information may include a charge of the battery of the truck bed unit 110, the fuel level of the fuel tank of the truck bed unit 110, a status of one or more lights coupled to the truck bed (e.g. taillights). In some embodiments, a control system may include a four-wheel drive system. The four-wheel drive system may control one or more wheels 106 of the truck 102. In one embodiment, the wheels 106 may include wheels coupled to the truck bed unit 110. The four-wheel drive system may propagate signals from the four-wheel drive system of the truck 102 through the coupling 302 and to one or more wheels 106. The four-wheel drive system of the truck bed unit 110 may receive signals from the one or more wheels 106 and propagate those signals to the four-wheel drive system of the truck 102.

In some embodiments, the control system may control the operation of one or more systems of the truck 102. For example, a system of the truck 102 may include an alignment system. The alignment system may control movement of the truck 102 to align the truck 102 with a raised or elevated truck bed unit 110. Aligning the truck 102 with the truck bed unit 110 may include aligning a locking mechanism 116 with a corresponding receiving mechanism 118. In one embodiment, the control system may control the one or more mounts 402 described below.

Figure 4:
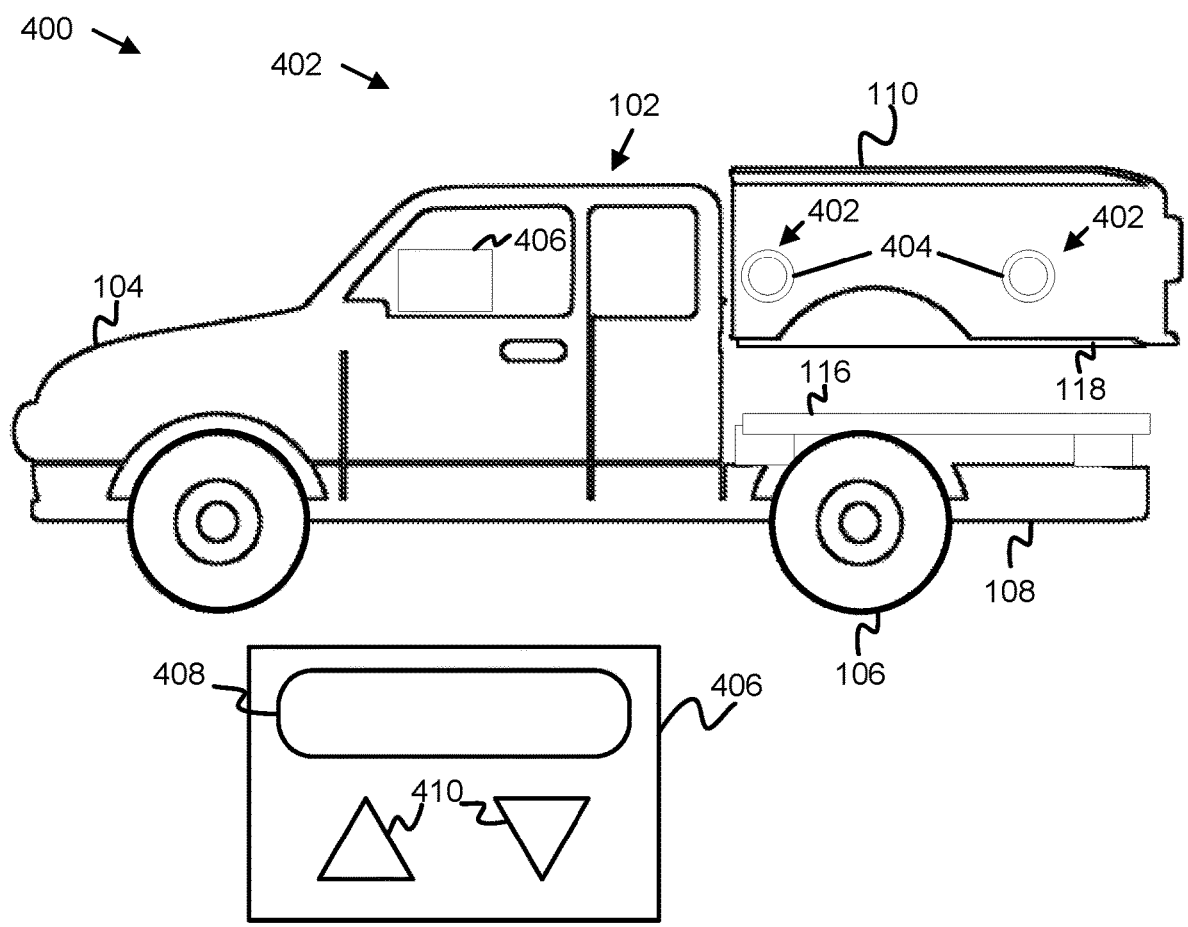
FIG. 4 is a cutaway side view illustrating an additional embodiment of a system for an interchangeable truck bed.

FIG. 4 depicts one embodiment of a system 400 for an interchangeable truck bed. In the depicted embodiment, the system 400 includes a truck 102, space 104 for a power source, a truck chassis 108, a truck bed unit 110, and one or more extensions 116, which may be substantially as described above with regard to FIG. 1A.

The system 400, in the depicted embodiment, may include one or more mounts 402 for moving the truck bed unit 110 toward or away from the truck chassis 108, and a control panel 406 for the one or more mounts 402. In some embodiments, the control panel 406 may include a screen 408 and an interface 410 that may allow a user to control the one or more mounts 402. In one embodiment, one or more of the mounts 402 may include a hydraulic/pneumatic mount, electric mount, or the like, or a combination thereof.

In one embodiment, a mount 402, may use a power source to move the truck bed unit 110 toward or away from the truck chassis 108. The power source may include the battery or electrical system of the truck 102, a battery or electrical system of the truck bed unit 110, or a combination thereof. In some embodiments, the one or more couplings 302 may decouple from the from the truck 102 or the truck bed unit 110 in response to the truck bed unit 110 moving away from the truck chassis 108. For example, the one or more couplings may decouple before the truck bed unit 110 begins moving away from the truck chassis 108, while the truck bed unit 110 is moving away, or after the truck bed 102 has moved into a standing position and has stopped moving away from the truck chassis 108.

In one embodiment, the one or more mounts 402 may lift the truck bed unit 110 off the truck chassis 108. In another embodiment, the one or more mounts 402 may slide the truck bed unit 110 off the truck chassis 108. The one or more mounts 402 may support the truck bed unit 110 in response to the truck bed unit 110 disconnecting from the truck chassis 108. The one or more mounts may tilt the truck bed unit 110 to facilitate moving the truck bed unit 110 toward or away from the truck chassis 108. The one or more mounts may tilt the truck bed unit 110 while the truck bed unit 110 is in a disconnected state from the truck chassis 108.

In a certain embodiment, the one or more mounts 402 may retract into the truck 102 or the truck bed unit 110 when not in use. In another embodiment, the one or more mounts 402 may be removable by a truck operator. With the one or more mounts 402 removed or retracted, a person can use truck 102 after the truck bed unit 110 lowered onto the truck chassis 108 and the one or more extensions 116 have connected the truck bed unit 110 to the truck chassis 108. In one embodiment, the one or more mounts 402 may couple to the truck bed unit 110. In another embodiment, the one or more mounts 402 may be couple to the truck chassis 108 or other area of the truck 102.

In a certain embodiment, the one or more mounts 402 may communicate with or send signals to and/or receive signals from the one or more extensions 116. In response to sending signals to and/or receiving signals from the one or more extensions 116, the one or more mounts 402 may retract into the truck 102.

In one embodiment, at least a portion of the one or more mounts 402 is integrated with and/or part of the truck bed unit 110. The one or more mounts 402 may be configured to such that an operator may back up or reverse the truck 102, so that the truck chassis 108 clears the one or more mounts 402 (e.g., with little or no contact with the mounts 402), allowing the one or more extensions 116 and/or the couplings 302 to lock and/or couple. The truck bed unit 110 and/or the truck chassis 108, may include one or more alignment features (e.g., a channel, groove, or the like) to guide the truck 102 and/or truck chassis 108 into coupling position with the truck bed unit 110. Once coupled, in certain embodiments, the one or more mounts 402 may retract within the truck bed unit 110, so that the one or more mounts 402 are not visible, are not noticeable, or the like.

In one embodiment, at least a portion of the one or more mounts 402 are integrated with, are disposed on, and/or are part of the truck 102 and/or the truck chassis 108. The one or more mounts 402 may be operable to extend from the truck chassis 108 to engage the truck bed unit 110 (e.g., from a position flat on the ground, or the like) to lift the truck bed unit 110, to pull the truck bed unit 110 onto the truck chassis 108, or the like. In response to the truck bed unit 110 coupling with the truck chassis 108, in certain embodiments, the truck bed unit 110 may hide or cover the one or more mounts 402.

In one embodiment, a control panel 406 may control the one or more mounts 402. In some embodiments, the control panel 406 may include a screen 408. In a certain embodiment, the screen 408 may indicate whether the truck bed unit 110 is connected to the truck chassis 108. In another embodiment, the screen 408 may indicate whether one or more couplings 302 (as may be substantially as described above with regard to FIG. 3) are active or communicating fuel, electricity, air, or the like from the truck 102 to the truck bed unit 110. In one embodiment, the screen 408 may indicate whether the mounts 402 have retracted or been removed. In a certain embodiment, the control panel 406 may include an interface 410 that a user may interact with to control the one or more mounts 402 to move the truck bed unit 110 towards or away from the truck chassis 108. An interface 410 to control the one or more mounts 402 may include one or more buttons, levers, cranks, switches, touchpads, touchscreens, scroll wheels, or other controls that a user may operate to control the one or more mounts 402. The interface 410 may include a microphone that may receive voice commands.

In one embodiment, the system 400 may include a manual override that may allow a user to move the truck bed unit 110 away from or toward the truck chassis 108 without using the control panel 406 or the one or more mounts 402. In one embodiment, the truck 102 may include the control panel 406. For example, dashboard of the cab of the truck 102, the steering wheel, or the like may include the control panel 406 and/or the interface 410

In one embodiment, the control panel 406 may include a remote device that communicates wirelessly with the one or more mounts 402. In some embodiments, the control panel 406 may include software on an electronic device. For example, the control panel 406 may include a phone, a tablet computer, or the like. The software may include an application (app) for a phone. The control panel may wirelessly communicate with the one or more mounts in a variety of ways. For example, the control panel 406 and the one or more mounts may communicate using BLUETOOTH, near-field communication (NFC), ZIGBEE, Wi-Fi, a cellular network, or the like.

Figure 5A:
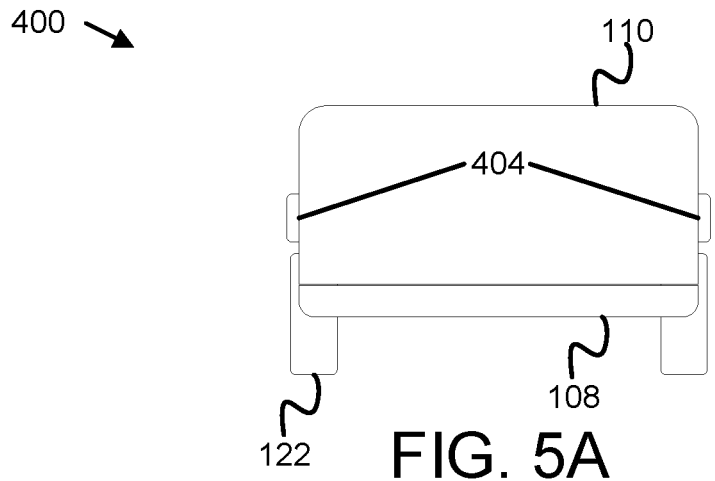
FIG. 5A is a cutaway rear views illustrating an additional embodiment of a system for an interchangeable truck bed.
Figure 5B:
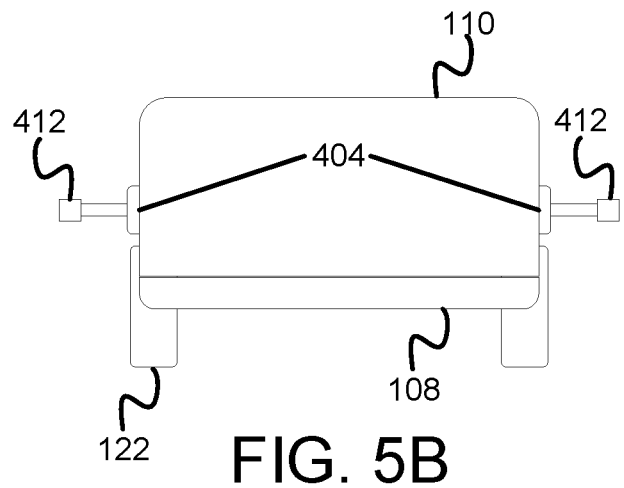
FIG. 5B is a cutaway rear views illustrating an additional embodiment of a system for an interchangeable truck bed.
Figure 5C:
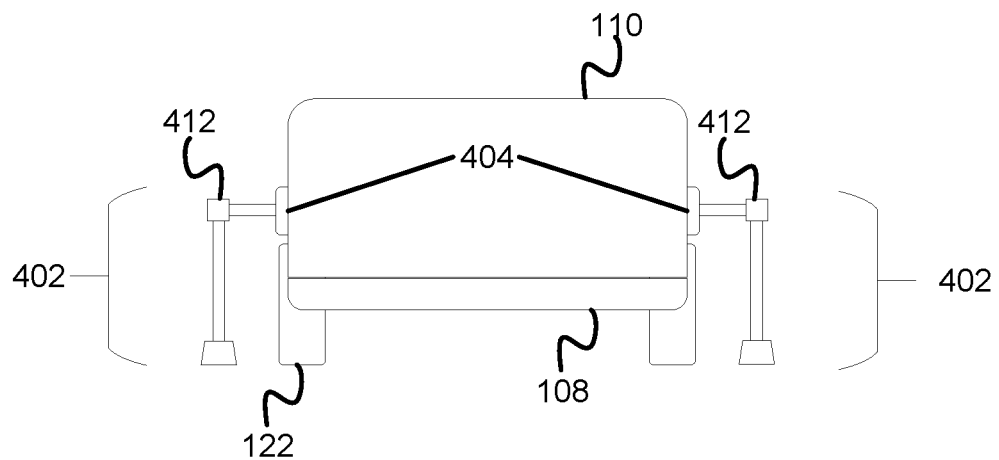
FIG. 5C is a cutaway rear views illustrating an additional embodiment of a system for an interchangeable truck bed.

FIGS. 5A-C depict embodiments of a system 400 for an interchangeable truck bed. FIG. 5A depicts the system 400 that may include the truck bed unit 110, the truck chassis 108, and the one or more mounts 402, which may be substantially as described above with regard to FIG. 1A and FIG. 4. In one embodiment, the system 400 may include one or more mount coverings 404. In one embodiment, the one or more mounts 402 may be coupled to the truck bed unit 110. In one embodiment, the one or more mounts 402 may include a leg 412. The leg 412 may extend away from the truck bed unit 110. In one embodiment, the leg 412 may support the truck bed unit 110. The leg 412 may support the truck bed unit 110 in response to the truck bed unit 110 decoupling from the truck chassis 108.

In some embodiments, the one more mount coverings 404 may cover the area of the truck bed unit 110 where the one or more mount legs 412 may be housed when retracted or not in use. The one or more mount coverings 404 may screw on to the truck bed unit 110, may couple by a hinge to the truck bed unit 110, or the like.

FIG. 5B depicts the system 400 that may include the truck bed unit 110, the truck chassis 108, the one or more mount coverings 404, and one or more mount legs 412. In one embodiment, the one or more mount coverings may extend away from the truck bed unit 110. The one or more mount legs 412 may extend away from the truck bed unit 110. The one or more mount legs 412 may extend a length away from the truck bed unit 110 to clear the wheel area of the truck chassis 108 or the truck 102.

FIG. 5C depicts the system 400 that may include the truck bed unit 110, the truck chassis 108, the one or more mount coverings 404, and the one or more mount legs 412. The mount legs 412 may extend downward and may engage with the ground. In one embodiment, the mount legs 412 may extend downward and/or away from the truck bed unit 110 in response to the transmission of the truck 102 is in "Park" or "Neutral." In another embodiment, the mount legs 412 may extend downward or away from the truck bed unit 110 in response to a person engaging the emergency/hand brake.

In one embodiment, a system 400 for interchanging a truck bed unit 110 of a truck 102 may be manufactured as part of a new truck 102. In another embodiment, an existing truck 102 may be retrofitted with a system 400 for interchanging a truck bed unit 110 of a truck 102.

Figure 6:
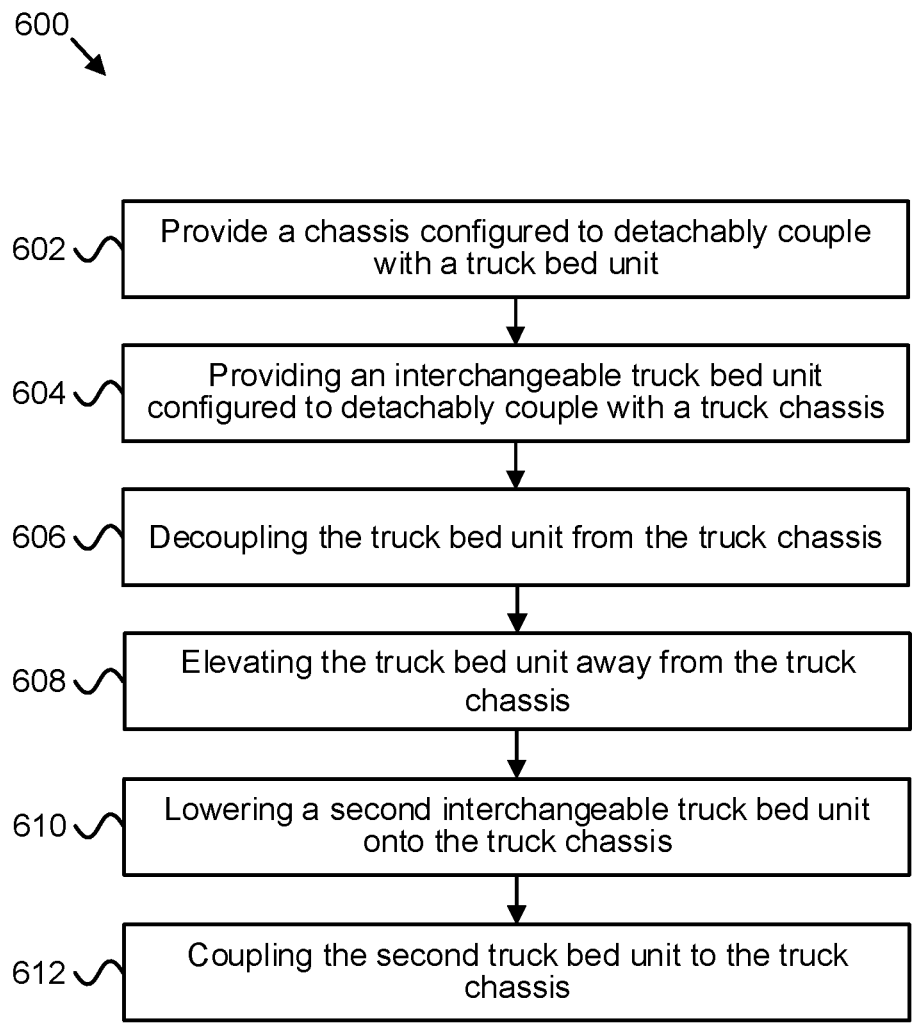
FIG. 6 is a schematic flowchart diagram illustrating one embodiment for an interchangeable truck bed.

FIG. 6 depicts one embodiment of a method for an interchangeable truck bed. In one embodiment, the method may include providing 602 a truck chassis configured to detachably couple with a truck bed unit. The truck chassis may include the truck chassis 108, which may be substantially as described above with regard to FIGS. 1-5. For example, the truck chassis may include one or more extensions (such as the one or more extensions 116 described above) that may extend away from the truck chassis.

In one embodiment, the method may include providing 604 an interchangeable truck bed unit configured to detachably couple with the truck chassis. The truck bed unit may include the truck bed unit 110 described above. For example, the truck bed unit may include one or more receiving mechanisms (such as the one or more receiving mechanisms 118 described above) that may receive the one or more extensions of the truck chassis. The one or more extensions and receiving mechanisms may detachably couple together to lock the truck chassis and the truck bed unit together.

In one embodiment, the method may include decoupling 606 the truck bed unit from the truck chassis. Decoupling 606 the truck bed unit from the truck chassis may include detaching the one or more extensions from the one or more receiving mechanisms. In one embodiment, decoupling 606 the truck bed unit from the truck chassis may include decoupling at least one clamp of the truck bed unit from the truck chassis, as described above. Decoupling 606 the truck bed unit from the truck chassis may include removing an aperture of the truck bed unit from around a post of the truck chassis, which may be substantially as described above with regard to FIGS. 1-5. Decoupling 606 the truck bed unit from the truck chassis may include decoupling a lock of the truck chassis from a receiving mechanism of the truck bed, as described above.

In one embodiment, decoupling 606 the truck bed unit from the truck chassis may include decoupling a system coupling that couples the truck bed unit to the truck. For example, as described above, one or more couplings 302 may couple the truck bed unit 110 to the truck 102. The one or more couplings may include an electrical coupling, a fuel couplings, or the like, which may be substantially as described above with regard to FIG. 3. In one embodiment, the one or more couplings may automatically decouple from the truck or the truck bed unit. Automatically decoupling may include the coupling decoupling from the truck or truck bed unit non-manually, in response to a command from a control interface (such as the control panel 406 described above, a remote, or the like), or the like.

In one embodiment, the method may include elevating 608 the truck bed unit away from the truck chassis. Elevating 608 the truck bed unit may include using one or more mounts (such as the one or more mounts 402 described above) to lift the truck bed unit upwards. Elevating 608 to truck bed unit may include elevating the truck bed unit a sufficient height to allow the truck to move away from the truck bed unit.

In one embodiment, the method may include lowering 610 a second interchangeable truck bed unit onto the truck chassis. Lowering 610 the second interchangeable truck bed unit may include using the one or more mounts to lower the truck bed unit as described above.

In one embodiment, the method may include coupling 612 the second truck bed unit to the truck chassis. Coupling 612 the second truck bed unit to the truck chassis may include the one or more extensions of the truck chassis detachably coupling to the one or more receiving mechanisms of the truck bed unit, which may be substantially as described above with regard to FIGS. 1-5. In one embodiment, coupling 612 a second truck bed unit to the truck chassis comprises coupling a system coupling that couples the second truck bed unit to the truck. In one embodiment, the system coupling may include an electrical coupling, a fuel coupling, or the like as described above. In one embodiment, the system coupling may automatically couple to the truck bed unit or the truck. Automatically coupling may include coupling the truck to the truck bed unit non-manually, in response to a command from a control interface (such as the control panel 406 described above, a remote, or the like), or the like.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A system comprising:
   a truck chassis comprising an electric motor;
   at least one extension disposed on an upper side of the truck chassis, the extension protruding away from the truck chassis;
   an interchangeable truck bed unit configured to detachably couple with the at least one extension of the truck chassis; and
   a power source for the electric motor, the power source disposed in the interchangeable truck bed unit and providing power to the electric motor through an electrical coupling between the interchangeable truck bed unit and the truck chassis.

2. The system of claim 1, wherein the power source comprises a battery that provides electric power for the electric motor from the interchangeable truck bed unit to a battery of the truck chassis.

3. The system of claim 2, wherein the battery of the power source comprises a backup battery for the battery of the truck chassis.

4. The system of claim 1, further comprising at least one receiving mechanism disposed on an underside of the interchangeable truck bed unit, the at least one receiving mechanism detachably coupling the electrical coupling to at least a portion of the at least one extension.

5. The system of claim 4, wherein the at least one receiving mechanism comprises at least one groove and the at least one extension comprises:
   a lock extender configured to extend toward the interchangeable truck bed unit;
   a lock disposed on an end of lock extender and configured to insert into the at least one groove of the at least one receiving mechanism.

6. The system of claim 4, wherein the at least one extension comprises a rail and the at least one receiving mechanism comprises at least one clamp.

7. The system of claim 4, wherein the at least one extension comprises a post and the at least one receiving mechanism comprises an aperture.

8. The system of claim 4, wherein one or more of the at least one extension and the at least one receiving mechanism comprises one or more of:
   a hydraulic/pneumatic clamp configured to grip to protrusions mounted on the at least one extension and the at least one receiving mechanism;
   an electric clamp configured to grip to protrusions mounted on the at least one extension and the at least one receiving mechanism;
   a hydraulic/pneumatic extension configured to extend away from the truck chassis; and
   an electric extension configured to extend away from the truck chassis.

9. The system of claim 1, further comprising at least one mount coupled to the interchangeable truck bed unit, the mount comprising a leg that extends away from the interchangeable truck bed unit and supports the interchangeable truck bed unit in response to the interchangeable truck bed unit decoupling from the truck chassis.

10. The system of claim 1, wherein the electrical coupling further comprises one or more of:
   an audio coupling configured to connect an audio system of the truck chassis with an audio system of the interchangeable truck bed unit;
   a video coupling configured to connect a video system of the truck chassis with a video system of the interchangeable truck bed unit;
   a control signal coupling configured to connect a control system of the truck chassis with a control system of the interchangeable truck bed unit; and
   a four-wheel drive signal coupling configured to connect a four-wheel drive system of the truck chassis with a four-wheel drive system of the interchangeable truck bed unit.

11. The system of claim 1, wherein the interchangeable truck bed unit comprises one or more of:

a passenger bed comprising one or more seats and configured to hold one or more passengers in the one or more seats;

a box bed comprising at least one wall extending upwards from a bed of the interchangeable truck bed unit and configured to hold cargo;

a flatbed comprising a flat surface;

a fuel economy bed comprising a cover disposed over a box bed, the cover configured to reduce air resistance of the interchangeable truck bed unit;

an off-road vehicle hauler comprising a ramp extendable away from the truck bed unit and configured to provide a ramped surface from the ground to a bed of the interchangeable truck bed unit;

a camper comprising an enclosure configured to provide a living space for one or more people;

a towing bed configured to tow a second vehicle; and a tanker bed comprising a tank configured to hold a fluid.

12. An apparatus comprising:
a truck bed configured to detachably couple to a truck chassis;
at least one receiving mechanism disposed on an underside of the truck bed, the at least one receiving mechanism detachably coupleable to at least a portion of the truck chassis; and
a power source disposed in the truck bed and configured to provide power to the truck chassis through a coupling of the at least one receiving mechanism.

13. The apparatus of claim 12, wherein the power source comprises a battery configured to provide electric power for an electric motor of the truck chassis from the truck bed.

14. The apparatus of claim 12, wherein the power source comprises a fuel tank configured to provide fuel for an engine of the truck chassis from the truck bed.

15. The apparatus of claim 14, wherein the fuel comprises one of a gasoline and a diesel fuel.

16. An apparatus comprising:
a truck chassis configured to detachably couple to a truck bed;
at least one extension disposed on an upper side of the truck chassis, the at least one extension detachably coupleable to at least a portion of the truck bed; and
an electric motor disposed in the truck chassis and configured to receive power from a power source in the truck bed through a coupling of the at least one extension.

17. The apparatus of claim 16, wherein the power source comprises a battery configured to provide electric power for the electric motor from the truck bed.

18. The apparatus of claim 17, wherein the battery of the power source comprises a backup battery for a battery of the truck chassis.

19. The apparatus of claim 16, wherein the at least one extension comprises a lock extender protruding away from the truck chassis toward the truck bed with a roller disposed on an end of the lock extender, the truck bed comprises at least one receiving mechanism comprising an elongate groove disposed on an underside of the truck bed, and the groove of the at least one receiving mechanism comprises a guide into which the roller rolls and that detachably couples the roller to the at least one extension.

* * * * *